No. 647,987. Patented Apr. 24, 1900.
E. S. RONEY.
TIRE FOR BICYCLES OR OTHER VEHICLES.
(Application filed June 30, 1899.)
(No Model.)

Witnesses
Q. J. Colbourne.
A. M. Ridout

Inventor
Edward S. Roney
by Ridout & Maybee
Attys

THE NORRIS PETERS CO., PHOTO-LITHO., WASHINGTON, D. C.

UNITED STATES PATENT OFFICE.

EDWARD S. RONEY, OF TORONTO, CANADA.

TIRE FOR BICYCLES OR OTHER VEHICLES.

SPECIFICATION forming part of Letters Patent No. 647,987, dated April 24, 1900.

Application filed June 30, 1899. Serial No. 722,411. (No model.)

*To all whom it may concern:*

Be it known that I, EDWARD SAUNDERS RONEY, merchant tailor, of the city of Toronto, in the county of York and Province of Ontario, Canada, have invented certain new and useful Improvements in Tires for Bicycles or other Vehicles, of which the following is a specification.

The objects of my invention are, first, to devise a strong, durable, and easily-repaired tire, and, second, to provide means for locating punctures therein.

With these objects in view my invention consists, first, of a canvas-strengthened main tire and an outer cover having one side cemented to the rim and its other side enlarged or provided with a hook adapted to engage a projection or hook formed on the cemented side of the cover or the rim, and, second, of a band of very thin black rubber located between the tire and cover, the tire being preferably of whitened rubber, the whole being constructed in detail substantially as hereinafter more specifically described and then definitely claimed.

Figure 1:
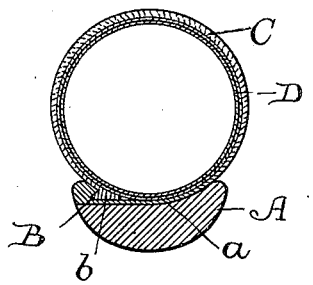
Figure 2:
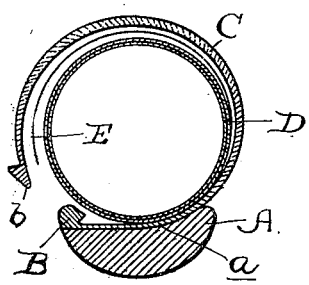
Figure 3:
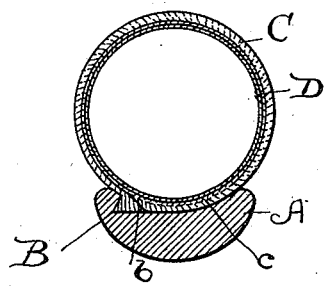
Figure 4:
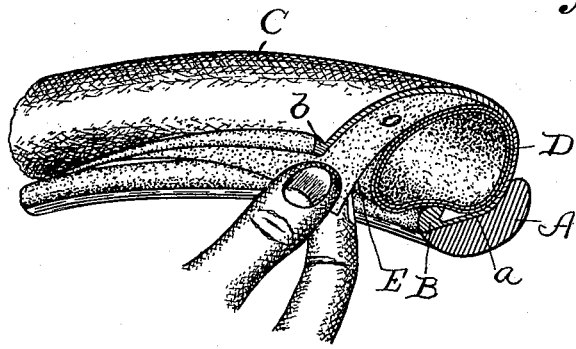

Figure 1 is a cross-section showing my tire in position on the rim and fully inflated. Fig. 2 is a similar view showing the tire partly deflated and the outer cover disconnected from the rim at one side. Fig. 3 is a cross-section of the tire, showing a modification thereof. Fig. 4 is a perspective view of a portion of the tire deflated and showing the method of locating the puncture.

In the drawings like letters of reference indicate corresponding parts in the different figures.

A is the rim, which is preferably of crescent shape, with one of the horns of the crescent cut down.

C is the cover of the tire, which is formed either wholly of rubber or else provided with a lining of light canvas or other fabric. One side of this cover is cemented at $a$ to the rim and has a hook or projection B formed thereon, which substantially completes the crescent of the rim. The other side of the cover is provided with an enlargement or hook $b$, which may be engaged with the hook or projection B.

D is the main tire, which is preferably strengthened with one or more thicknesses of canvas or other suitable fabric, and either is formed separate from or is secured to the outer cover at the rim side, as indicated by the dotted line $c$ in Fig. 3.

Located between the main tire and the cover is a band of very thin elastic rubber E, which I call the "puncture-locater." The edge of this band opposite to the detachable edge of the cover may be suitably secured either to the main tire or the cover. If this band is unattached, it is preferably made slightly smaller in circumference than the main tire, so that force of contraction will securely hold it in position. The surface of the main tire is preferably formed of white rubber similar to that of which whitened elastic bands are made. The puncture-locater, on the contrary, is preferably formed of black rubber. I find that when the stiffened main tire is perforated by a sharp point a very white mark appears on the surface of the rubber where the point has penetrated. Further, before the point can penetrate the main tire it must first penetrate the puncture-locater. By raising the edge of the outer cover, as indicated in Fig. 3, and stretching the puncture-locater the hole in the latter becomes apparent and a white puncture-mark on the main tire is immediately visible through the hole in the puncture-locater.

In Fig. 3 I show a modification of my tire in which the hook B is formed integral with the rim and the main tire formed integral with or cemented to the cover.

Having described this portion of my invention, I will briefly set out its advantages and how it differs from those in general use.

I claim that my tire possesses greater durability, strength, and simplicity than any now in the market. As the inner tube forms the main tire and takes most of the air-pressure, the strain on the cover is very much less than in ordinary double-tube tires and there exists no tendency whatever for its hooked edge to pull out of engagement with the hook on the rim, and even if it did so the inner tube cannot blow out or burst, as it possesses all the strength of an ordinary single-tube tire. A comparatively-small portion of the strain being borne by the cover, it is in the best con- dition to resist puncture, as stretched rubber becomes of a somewhat porous nature and is very easily penetrated by sharp points.

In practice it will be found desirable to make the main tire a somewhat loose fit within the cover when the tire is deflated, so that a good deal of the pressure will be taken up by the main tire before any pressure whatever comes upon the cover.

This tire being cemented to the rim, it is absolutely impossible for it to roll, creep, or slide, and it thus possesses all the advantages of the single-tube tire with none of its disadvantages, for as it is provided with an outer cover it is possible to repair it by patches applied to the outside of the main tire, as in the ordinary double-tube tire, and at the same time it possesses none of the disadvantages of the double-tube tire, in which all the strain of the air-pressure is on the outer cover, tending to tear it away from the rim or else to split the latter.

When the tire is fully inflated, the hook $b$ is securely held in engagement with the hook B and a very round clean tire is obtained, fitting close to the rim at either side.

When tires become punctured and it is desired to find the spot, it is simply necessary to open the edge of the cover and slightly stretch the puncture-locater, as previously described, working gradually around the tire until the puncture-locater has been stretched over every portion of the surface of the inner main tire. When the puncture is reached, it will be indicated, as already described. It will be found in practice that no matter how "slow" the puncture is it can be found and repaired in two minutes without the aid of water, which tends to rot the inner tubes of ordinary tires, and without any exertion beyond the powers of an eight-year-old child and without soiling the hands.

It will be found that this tire will stand much pressure and is very suitable for use on sulkies or other heavy vehicles, as no jack is needed to raise the vehicle when it is desired to repair the puncture. By simply walking forward the horses every portion of the tire can be brought to a point convenient for examination, as above described.

As in this tire it is unnecessary to remove the main tire in locating or repairing punctures, there is no possibility of it becoming twisted or deranged, nor can it be pinched when replacing the cover after repairing the puncture.

Although my tire is best fitted to a crescent rim by cutting down one of the horns of the crescent, yet it could without much difficulty be fitted to a crescent rim without such a cutting down, although in such a case it might be necessary to thicken considerably the portion of the cover cemented to the rim. By cutting down the crescent rim and cementing the outer cover I secure all the advantages of a cemented tire, with the easy detachability of a clencher-tire.

What I claim as my invention is—

1. In a tire a main tire and a cover which may be opened to expose the main tire, in combination with a thin band of rubber located between them, substantially as and for the purpose specified.

2. In a tire a main tire having its surface of white rubber and a cover which may be opened to expose the main tire, in combination with a thin band of black rubber secured at one edge to the tire or cover and located between them, substantially as and for the purpose specified.

3. In a tire a main tire and a cover which may be opened to expose the main tire, in combination with a thin band of rubber located between them and secured more or less completely at one edge to a part of the tire, substantially as and for the purpose specified.

Toronto, Canada, June 21, 1899.

EDWARD S. RONEY.

In presence of—
J. EDW. MAYBEE,
J. STEWART RICE.